Jan. 7, 1941.  R. M. WERNER  2,228,132
DELIVERY TRUCK
Filed Dec. 10, 1938  3 Sheets-Sheet 1

INVENTOR:
Ralph M Werner
BY
His ATTORNEY.

Jan. 7, 1941.　　　　R. M. WERNER　　　　2,228,132
DELIVERY TRUCK
Filed Dec. 10, 1938　　　　3 Sheets-Sheet 2
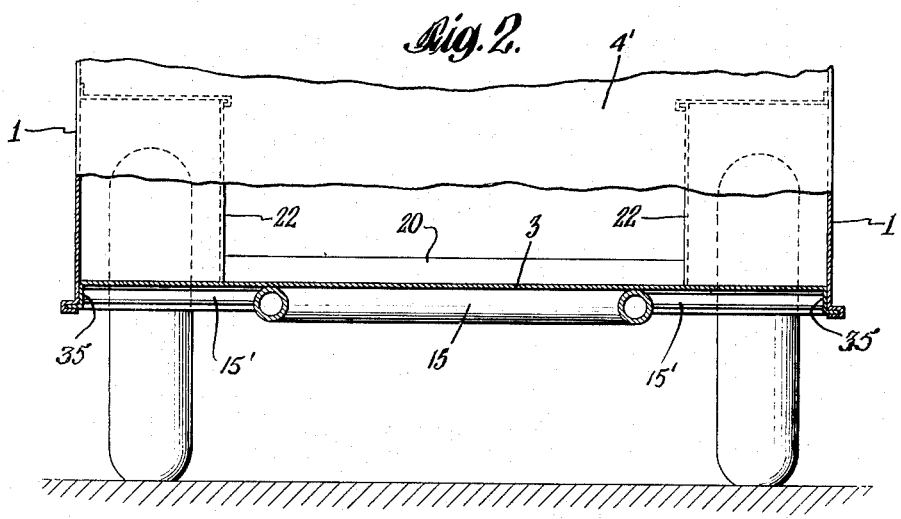
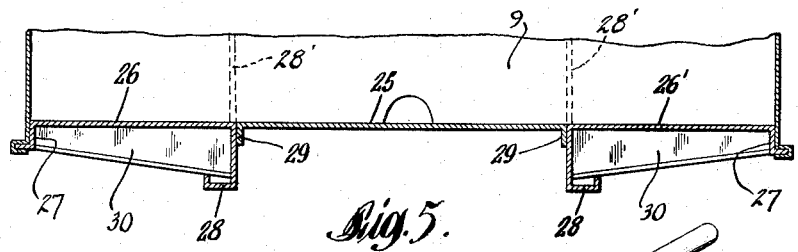
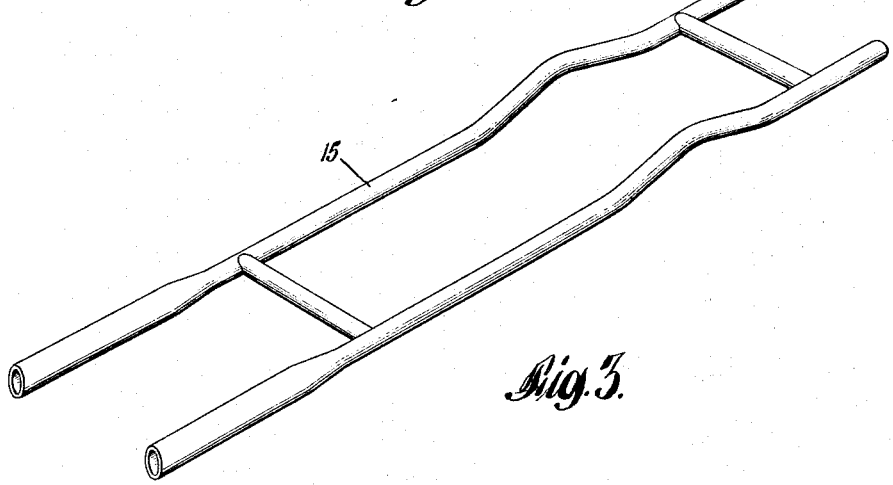
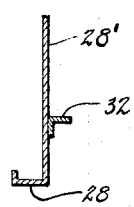
INVENTOR:
Ralph M. Werner,
BY
H. H. Swenarton,
His ATTORNEY.

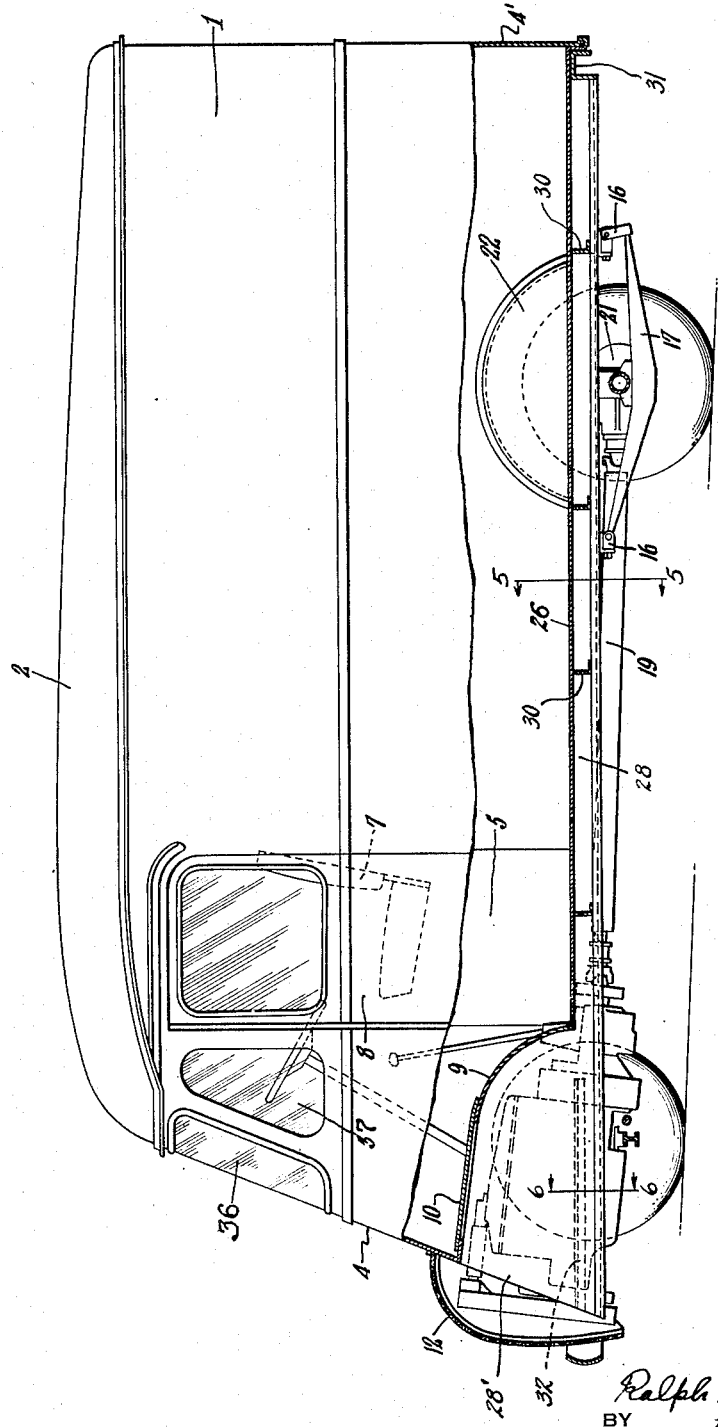

Patented Jan. 7, 1941

2,228,132

UNITED STATES PATENT OFFICE 2,228,132

DELIVERY TRUCK

Ralph M. Werner, Brooklyn, N. Y.

Application December 10, 1938, Serial No. 244,941

7 Claims. (Cl. 280—106)

This invention relates to the structure of automobile vehicles, more especially automobile trucks and busses, and has for its particular objects the provision in such vehicles of a body structure, which is simple and economical to assemble, remarkably rugged, being especially resistant to torsional and radial thrusts or strains, of especially large storage or passenger-carrying capacity for its overall dimensions and whose floor is essentially free from any longitudinal tunnel projecting above the level thereof and disposed at step level above the ground over which the vehicle travels.

Other objects of the invention reside in the provision of a body underframe which is directly supported from the body and serves as a support for the main, axle-carrying springs and also for the power plant. Furthermore, the wheel axle assemblies and power plant are so mounted as to be readily accessible for replacement, inspection and repairs.

Still further objects of the invention comprise the provision of a driver's seat in operating compartment of the vehicle in such a position and at such a level that the driver can conveniently slide thereon after taking but a single step off the ground and when seated thereon has full vision of the road ahead besides enabling him to utilize the arcuate front wheel housing of vehicle as a foot rest. Other objects of the invention are hereinafter set forth.

In the accompanying drawings, in which I have illustrated certain preferred forms of my invention:

Fig. 2 is a fragmentary section on the line 2—2 of Fig. 1;

Fig. 3 is a perspective view showing the underframe of the body, isolated, and prior to the welding of the outriggers thereto;

Figure 1:
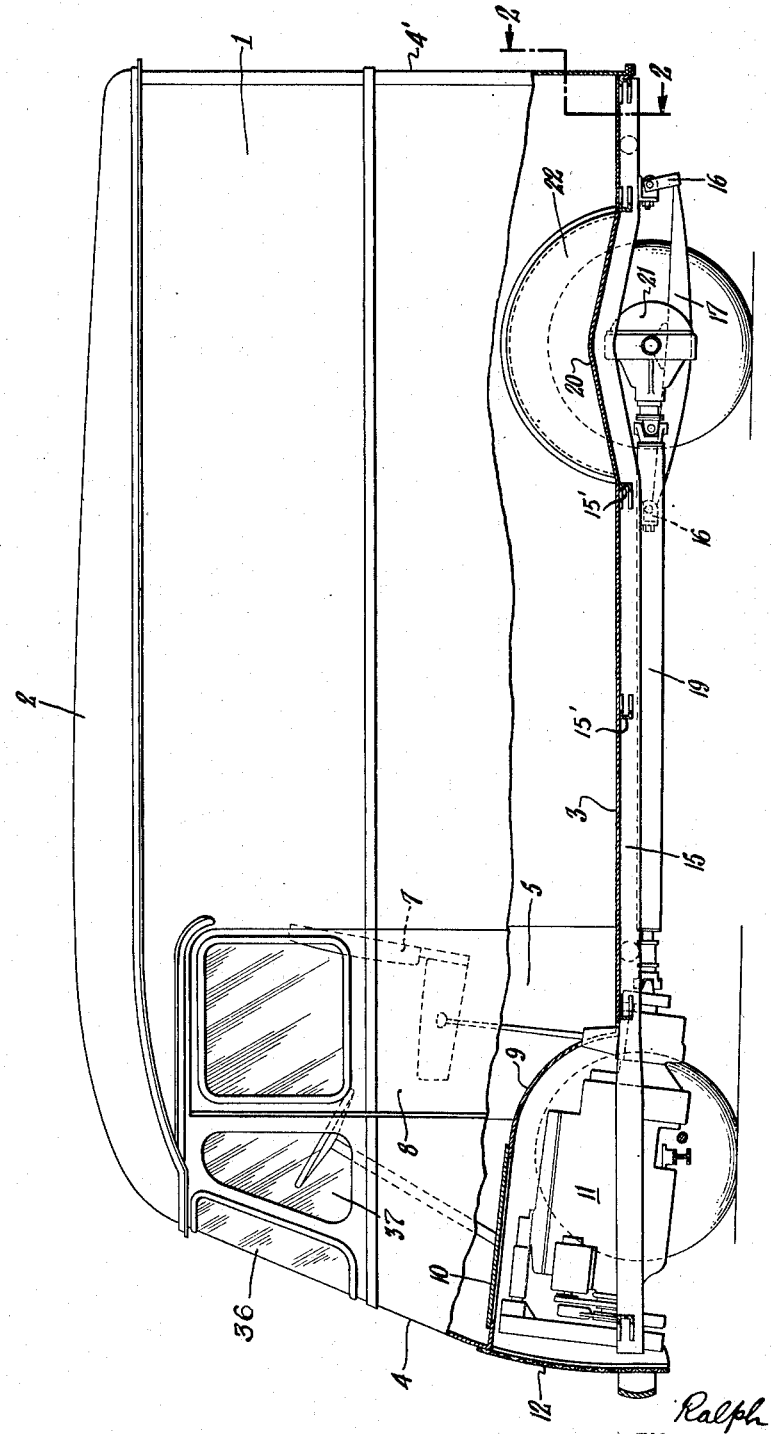
Figure 1 is a side elevation, partly in section of a parcel delivery truck embodying my invention.

Fig. 4 is a view generally similar to Fig. 1 but showing a modification wherein the underframe is integral with the floor of the body; and Figs. 5 and 6 are fragmentary vertical sections on the lines 5—5 and 6—6 respectively of Fig. 4.

Referring to Fig. 1 of the drawings and the construction shown therein, the reference numeral 1 designates the sides, 2 the top, 3 the floor and 4, 4' the respective ends of the body of the delivery truck illustrated, these members being assembled as shown. At the forward end or operating compartment 5 of the vehicle, a driver's seat 7 is mounted, the same preferably being positioned opposite the entrance door 8. As shown, the floor 3 of the body is disposed at the so-called step level from the ground and thereby the same can be utilized by the driver as a step on entering the vehicle and when sliding onto his seat. The front wheel housing 9 is of arcuate configuration and is provided with a movable plate or panel 10 which affords access to the power plant or engine 11 when it is desired to inspect or make minor repairs or adjustments of same. At the front of the body is a door or removable panel 12 which affords access to the engine compartment when it is desired to install or replace the same.

A skeleton tubular, body underframe 15, having outriggers 15' welded thereto (see Figs. 1 and 3) is welded directly to the floor 3, the same extending beneath the wheel housing to the front end of the body. Said underframe, besides serving to reinforce the body and particularly the floor thereof, serves as a support for the engine 11 which is slung therefrom, as well as for the spring shackles 16 which are bolted thereto and which support the main springs 17 by which the rear axles 18 are elastically connected to the said shackles and underframe. As shown, the engine 11 is obliquely mounted so that the propelling or drive shaft 19 extends substantially horizontally beneath said underframe and consequently the body underframe also serves both as the vehicle chassis and a body support, whereby the said floor can be dropped to the aforesaid step level without necessitating the provision of the usual longitudinal shaft tunnel, it being merely necessary, in a body of the construction shown in Fig. 1, to provide a slight ramp 20 which accommodates the differential housing 21 of the vehicle and spans the rear axles between the wheel housings 22.

The construction illustrated in Fig. 4 is generally the same as that illustrated in Fig. 1, except that the floor of the delivery truck therein shown is slightly pitched or inclined upwardly towards the rear, the same being at step level opposite the entrance door and but slightly higher at the rear end thereof, the pitch of the floor being so slight, however, that as the motor vehicle travels on the road, the floor line thereof appears to be substantially horizontal. Said floor is formed of a plurality of longitudinally extending sheet metal plates or sections, the same including a central section 25 and marginal sections 26, 26', the latter two being identical but oppositely disposed. Said marginal sections each have drop flanges 27 which extend along the outer margins thereof and to which the lower edge of an adjacent side wall member 1 is crimped and these sections also have integral longitudinal channel beams 28 depending from their respective inner margins. The central section 25 has similar opposing integral depending flanges 29 formed thereon which, when the floor is assembled, abut against the adjacent face of the associated channel member 28 to which they are firmly welded. Outriggers or angle iron ribs 30 are disposed at intervals beneath the marginal sectons 26, 26', the said outriggers being respectively welded to the adjacent faces of the drop flanges 27 and the channel members 28.

In order to increase the resistance to torsional stresses of the channel underframe construction illustrated in Fig. 4, I provide transverse rear channel beam 31 which is welded to the floor sections and extends laterally completely across the same, thus serving to tie the channel members 28 together at the rear end of the body. These channel members and the floor sections 25, 26, 26', as shown, are tied together at their front ends by the wheel housing 9, which extends completely across the body and affords a compartment beneath the same for the reception of the power plant, said entire housing preferably comprising but a single arched metal sheet.

The floor sections 26, 26' commencing at the line of junction with the housing 9, are formed into vertical webs 28' (see Figs. 4, 5 and 6) which have arcuate top edges that conform to the curvature of the adjacent bottom surface of housing 9 against which they abut and to which they are welded. The channel members 28 extend completely to the front of the body and are provided with channel iron brackets 32 (see Fig. 6) which are welded to the inner faces of said extended channel members 28 and which serve as supports for the engine that rests thereon when installed within the power plant compartment.

The floor of the body shown in Fig. 1 has a drop flange 35 (see Fig. 2) identical with the aforesaid flange 27, and to which the rear wall 4' of the body is crimped, thus not only insuring rigidity of the body so that it effectively resists radial or transverse thrusts or stresses, but also tortional strains or stresses.

The aforesaid underframe construction, whether the longitudinals thereof comprise tubular members which, due to their circular sections, possess a remarkably high tortional section modulus, some 25 to 1, or whether the same comprise integral channel beams of relatively low tortional section modulus but having a high modulus for rupture when subjected to transverse stresses, permit of the floor of the body, when the same is interlocked in the manner herein described with the side walls, being disposed at substantially step level from the ground while dispensing with the necessity of providing a longitudinal shaft tunnel projecting above the floor level, such as is now frequently employed in both truck and pleasure cars, all without sacrificing the inherent rigidity of the body and its floor or in any way lessening the resistance thereof to tortional, radial or other transverse strains or stresses.

It will be noted that in the construction shown in Figs. 1 and 4, the entire floor of the load-carrying compartment is transversely rectilineal and except for the transverse ramp 20 (see Fig. 1), the floor in both of these constructions is essentially longitudinally rectilineal i. e., longitudinal obstructions projecting above the floor level such as the shaft tunnel or otherwise.

It is, of course, understood that the sides and roof of the body may be composed of steel, wood composition board or the like and that any number of doors, including a rear door, if desired, may be provided for the storage compartment. The front of the operating compartment is provided with the usual windshield 36 and side quarter windows 37, these being so disposed to afford full vision of the road ahead and each curb thereof to the driver when on his seat in the operating compartment.

The aforesaid body construction is particularly advantageous for trucks or buses employed in congested areas where it is necessary for the driver or the passengers to repeatedly enter or leave the vehicle at the various stops may by such truck or bus, since in the case of a delivery truck, the fatigue experienced by the driver in the course of a day's work while covering the route assigned to him is minimized and in the case of both the truck and the bus, the stability is increased and the storage or passenger carrying compartment is rendered far more accessible to the driver or passengers.

The interlocking of the floor with the adjacent side-walls of the body and preferably also with the rear wall and the front wheel housing either by crimping, welding, riveting or otherwise interlocking the same together, also the underframe carried by the floor, whether the same be of tubular or channel beam type, and also the cross braces by which the frame longitudinals are tied together with the body walls, all contribute to the remarkable rigidity and ruggedness of the body structure and thus admit of the floor of the vehicle being disposed at step level from the ground without necessitating the employment of shaft tunnels or other longitudinal obstructions projecting above the floor level, all without sacrificing any of the desirable features possessed by truck or bus bodies which are mounted on the usual chassis and wherein the floor is disposed at a level considerably more than one step and customarily about two steps above the ground.

By employing the aforesaid construction all of the aforesaid desirable features can be realized while at the same time the ruggedness of the vehicle is materially increased and the cost of constructing the vehicle as compared with other bodies of the same capacity is substantially reduced.

Various modifications of the foregoing construction within the scope of the appended claims may be made without departing from the spirit of my invention.

Having thus described my invention, what I claim and desire to obtain by United States Letters Patent is:

1. In an automobile, the combination comprising a body having a wheel house and a load-carrying compartment, substantially the entire floor of the latter compartment being at step level from the ground and the roof of said wheel house being of arched configuration from front to rear and substantially rectilineal transversely thereof, a body supporting underframe having opposing longitudinals which are integral with said floor of the load-carrying compartment and which extend substantially throughout the length thereof and throughout the length of the wheel house and opposing vertical webs extending upwardly from the portion of each longitudinal beneath said wheel house and integral therewith for interconnecting the front ends of said longitudinals with the body thereby rendering the same as effective supports for the engine of the automobile and means for transversely bracing said framework, said means being substantially co-extensive in length with the width of the floor of a load-carrying compartment and being secured to said longitudinals.

2. In an automobile as claimed in claim 1 wherein the floor of the load-carrying compartment is interlocked with the lower edge of the sidewalls of such compartment.

3. In an automobile, the combination comprising a body having a wheel house and a load-carrying compartment, the roof of the wheel house being of arched configuration to accommodate the engine of the automobile beneath the same and substantially the entire floor of the load-carrying compartment being at step level from the ground, a body supporting underframe welded to the floor of the load-carrying compartment, said underframe including opposing longitudinals extending substantially the entire length of the automobile and having spaced cross-braces interconnecting them and also having spaced outriggers extending outwardly from said longitudinals to the sidewalls of the automobile, engine-supporting brackets carried by said longitudinals and positioned beneath the roof of the wheel housing and means for interlocking the floor of the load-carrying compartment with the adjacent sidewalls of the automobile.

4. In an automobile as claimed in claim 3 wherein a metal brace interconnects the said longitudinals at the rear ends thereof and extends completely across the rear end of the floor of the load-carrying compartment and beneath the same and wherein the floor of the load-carrying compartment is interlocked at its rear end with the end wall of the automobile.

5. In an automobile, the combination comprising a body having sidewalls, end walls and a floor, the latter being interlocked with the side and end walls and being arched at its front end to accommodate the engine of the vehicle thereberreath and an underframe secured to the bottom of said floor throughout the greater portion of the length of the latter and extending forwardly beneath the arched portion thereof and in alignment longitudinally with the longitudinal portions of said underframe which are secured to said floor.

6. In an automobile delivery truck, the combination comprising a body having front and end walls and a floor in interlocking engagement therewith, said body having a wheel house and a load-carrying compartment and the floor of the load-carrying compartment and throughout the driver's or operating compartment being at substantially step level from the ground and the roof of the wheel house being of arched configuration longitudinally and substantially rectilineal transversely to accommodate the engine of the vehicle therebeneath, a tubular underframe, having a plurality of opposing longitudinals, secured to the portion of the floor which is at step level from the ground and extending forwardly beneath said wheel house to substantially the front end of said truck, engine-supporting brackets carried by said longitudinals and positioned beneath the roof of the wheel housing and said floor of the load-carrying compartment being substantially transversely rectilineal throughout.

7. In an automobile delivery truck, the combination comprising a body having front and end walls with a floor in interlocking engagement therewith, said body having a front wheel house and a load-carrying compartment, an underframe secured to the floor of the load-carrying compartment, said underframe having opposing longitudinals extending substantially the entire length of the truck and serving as a support both for the engine and for the wheel supporting axles of the truck, transverse bracing means extending substantially completely across the body for reinforcing said underframe and for increasing the resistance thereof to tortional stresses, the said floor of the load-carrying compartment and the floor immediately to the rear of the wheel house being at substantially step level from the ground and transversely rectilineal throughout and the entire roof portion of the wheel house being of arched configuration to accommodate the vehicle engine beneath the same.

RALPH M. WERNER.